United States Patent [19]
Frazier et al.

[11] 3,723,935
[45] Mar. 27, 1973

[54] TEMPERATURE SENSOR
[75] Inventors: John F. Frazier, Painted Post; Garo M. Ziver, Corning, both of N.Y.
[73] Assignee: Corning Glass Works, Corning, N.Y.
[22] Filed: Feb. 17, 1972
[21] Appl. No.: 227,095

[52] U.S. Cl. ................338/28, 73/362 AR, 219/505
[51] Int. Cl. ..............................................H01c 7/02
[58] Field of Search ....338/28, 29, 30, 229; 219/504, 219/505; 73/362 AR

[56] References Cited

UNITED STATES PATENTS

| | | | |
|---|---|---|---|
| 2,728,832 | 12/1955 | Hoffman | 338/28 |
| 2,957,153 | 10/1960 | Greenberg | 338/28 |
| 3,144,629 | 8/1964 | Corby | 73/362 AR |
| 3,267,733 | 8/1966 | Chambers | 338/28 |
| 2,694,930 | 11/1954 | Lamb et al. | 73/362 AR |

Primary Examiner—Bernard A. Gilheany
Assistant Examiner—F. E. Bell
Attorney—Clarence R. Patty, Jr. et al.

[57] ABSTRACT

A temperature sensor comprising a coil of wire of a high temperature resistant material having a relatively high temperature coefficient of electrical resistance; and a hollow sheath of a high temperature oxidation resistant material having high thermal conductivity, and at least one flat outer side for improved thermal transfer when such flat side is disposed against or in physical contact with a surface of a plate or sheet of a vitreous material providing a cooking surface. The sheath surrounds the coil with a space provided between the sheath and coil, and a compacted powder of an electrical insulating material having a relatively high thermal conductivity surrounds the coil. In one embodiment, the sheath is electrically connected to one end of the coil by a conductor comprising a rod or wire of a high temperature oxidation resistant material having high electrical conductivity. An electrically conductive terminal is also electrically connected to the sheath, preferably at the end thereof opposite said one end of the coil. The second end of the coil is electrically connected to a similar conductor to which another electrically conductive terminal is electrically connected. In another embodiment, both ends of the coil are electrically connected to conductors which extend through the ends of the sheath and are provided with terminals for electrical connections to be made to the coil. In such embodiment no electrical connections are made to the sheath.

10 Claims, 4 Drawing Figures

Patented March 27, 1973 3,723,935
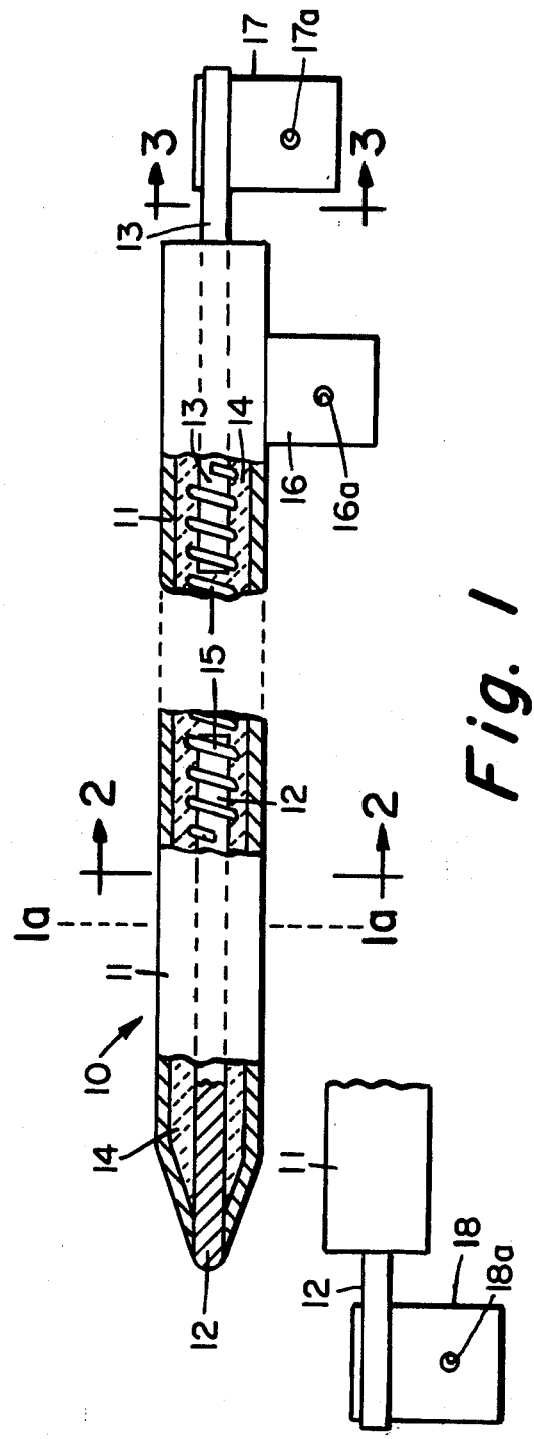
Fig. 1
Fig. 1a
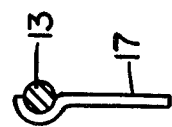
Fig. 2
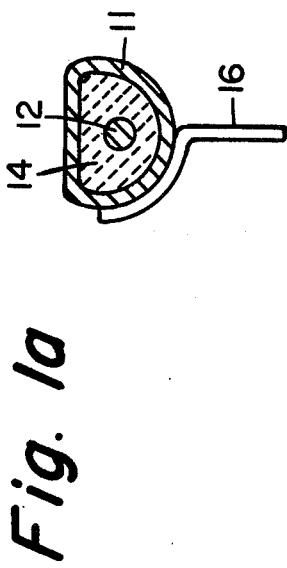
Fig. 3

TEMPERATURE SENSOR

BACKGROUND OF THE INVENTION

Temperature sensors making use of the temperature coefficients of electrical resistance of wires are relatively old and well known in the art. It is also old to use a compressed powder electrical insulating and high thermal conductivity material, such as magnesium oxide for example, for electrically insulating a wire coil from a surrounding sheath. An electric heating unit including a wire coil, a tubular metallic surrounding sheath and a powder electrical insulating and high heat conductivity material, such as magnesium oxide in powder form is disclosed, for example, in U.S. Pat. No. 2,499,961 issued Mar. 7, 1950 to T. H. Lennox. However, so far as could be determined, a temperature sensor of the type disclosed herein and especially adapted for sensing temperatures of glass or glass-ceramic cooking units or surfaces, which may normally reach temperatures of 700°C. and under abnormal conditions may reach temperatures in the 800°-900°C. range, has not heretofore been known. It is, therefore, an object of the present invention to provide a temperature sensor of the type mentioned. It is another object of the invention to provide a temperature sensor that can withstand relatively high temperatures such as in the 800°-900°C. range.

SUMMARY OF THE INVENTION

It is believed that the invention herein disclosed is sufficiently summarized in the foregoing abstract of the disclosure and, therefore, to avoid needless repetition or redundancy, it is considered expedient to omit a detailed summary of the invention.

BRIEF DESCRIPTION OF THE DRAWINGS

In the Drawings:

FIG. 1 comprises an elevational view, partially in cross section, of a first embodiment of a temperature sensor embodying the invention;

FIG. 1a is an elevational view illustrating a modification of the sensor of FIG. 1 to disclose a second embodiment of the invention;

FIG. 2 is a cross-sectional view of the sensor of FIG. 1, such view being taken generally along line 2—2 of FIG. 1; and FIG. 3 is a view similar to FIG. 2 but taken generally along line 3—3 of FIG. 1.

Similar reference characters refer to similar parts in each of the Figs. of the drawings.

PREFERRED EMBODIMENTS OF THE INVENTION

Referring to the drawings in detail, there is shown in FIG. 1 a sensor 10 embodying the present invention and comprising a hollow sheath 11 of a high temperature oxidation resistant material having high thermal conductivity and a cross-sectional configuration (FIG. 2) including a wall whose outer surface is bounded by a straight line and a curvilinear line so as to provide the sheath with at least one flat outer surface or side. An electrical conductor comprising a rod or wire 12 of a high temperature oxidation resistant material having high electrical conductivity is disposed in one end of sheath 11, and extends for a selected distance through the hollow of the sheath substantially concentric with such hollow and spaced from the inner surface or surfaces of the sheath. The first end of sheath 11 or the end of such sheath into which conductor 12 extends is tightly crimped about such conductor adjacent the corresponding or first end of the conductor and is also preferably welded thereto to provide a good electrical connection therebetween.

A first end of a helically wound coil of wire 15 of a high temperature resistant material having a relatively high temperature coefficient of electrical resistance closely surrounds the second end of conductor 12 which extends into sheath 11 and is electrically connected to the conductor, preferably by welding said first end of coil 15 to said second end of conductor 12. The second end of coil 15 is similarly electrically connected to a second end of a conductor 13 which may be identical to conductor 12 and which extends into the hollow of sheath 11 at the second end of the sheath substantially concentric with such hollow. The first end of conductor 13 extends out of the hollow of sheath 11 of some distance beyond said second end of the sheath and an electrically conductive terminal 17 is electrically connected to such first end of conductor 13 as by welding thereto for example (FIGS. 1 and 3). Terminal 17 is provided with a hole 17a for convenience in making an electrical connection to such terminal. Similarly, an electrically conductive terminal 16 is electrically connected to sheath 11 adjacent said second end thereof (FIGS. 1 and 2). Terminal 16 is provided with a hole 16a for convenience in making an electrical connection to such terminal.

A powder 14 (FIGS. 1 and 2) of an electrical insulating material having a relatively high thermal conductivity when compressed is deposited and compacted in said space between said inner surface of sheath 11 and the otherwise exposed surfaces of said components 12, 13 and 15, so as to fill said space and closely surround coil 15 for good thermal transfer between sheath 11 and such coil, especially in the region between the first ends of conductors 12 and 13. Material 14 may, for example, be magnesium oxide.

Referring now to FIG. 1a, only portions of sheath 11 and of conductor 12 adjacent the left hand ends thereof, (that is, to the left of line 1a—1a in FIG. 1) are shown since the remainder of the sensor, in the embodiment of the invention illustrated in FIG. 1a, is identical to that portion of the sensor of FIG. 1 which is to the right of said line 1a—1a with the exception that a terminal such as 16 is not provided on sheath 11. This will be readily apparent to those skilled in the art.

As shown in FIG. 1a, in the second embodiment of the invention, a portion of conductor 12 adjacent the first end thereof extends out of the first end of sheath 11 and for a distance beyond such end of the sheath in a manner similar to that in which conductor 13 extends out of the right hand end of sheath 11 (viewing FIG. 1). An electrical terminal 18 provided with a hole 18a is provided on conductor 12 for making an electrical connection to such conductor. In other words, the left hand end of the sensor of the embodiment of FIG. 1a is a mirror image of the right hand end of the sensor of the embodiment of FIG. 1 except, as previously mentioned, no terminal corresponding to terminal 16 is provided on sheath 11.

The following materials are set forth as specific examples of materials which may be used for sheath 11, conductors 12 and 13, and coil 15.

Sheath 11 may, for example, be made of INCOLOY brand tubing which is a product of The International Nickel Company, Inc. Such material is a nickel-iron-chromium alloy which may be obtained from Huntington Alloy Products Division of The International Nickel Company, Inc., Huntington, W. Va. 25720.

Conductors 12 and 13 may, for example, be made from the same material as sheath 11 or from another nickel-base alloy such as HASTELLOY brand alloy which is obtainable from Union Carbide Corporation, Stellite Division, whose address is 1020 West Park Avenue, Kokomo, Indiana 46901.

Coil 15 may, for example, be made of a nickel-base alloy such as ALUMEL brand wire which is obtainable from Hoskins Manufacturing Company, 4445 Lawton Avenue, Detroit, Michigan 48208.

It is pointed out that sheath 11 need not necessarily have a cross-sectional configuration such as shown in FIG. 2 of the drawings but may have any cross-sectional planar configuration bounded by straight lines, or by a combination of one or more straight lines and one or more curvilinear lines. The main requirement for the sheath such as 11 is that it have a hollow extending longitudinally through the sheath and of a sufficient size that conductors such as 12 and 13, and a wire coil such as 15, can extend linearly through such hollow without contacting the inner surface of the sheath except, as in the embodiment of FIG. 1, adjacent said first end of the sheath where the sheath is crimped to conductor 12 adjacent the first end of such conductor.

A sensor such as disclosed herein is especially suitable or adaptable for use with an electrical radiant heating element such as disclosed in copending application, Ser. No. 227,079 filed on even date herewith and assigned to the same assignee as the present application.

Although there is herein shown and described in detail only two forms of a sensor embodying my invention, it will be understood that various changes and modifications may be made therein within the purview of the appended claims without departing from the spirit and scope thereof.

We claim:

1. A sensor adapted for positioning against a surface of an electrically radiant heated plate or sheet of a vitreous material providing a cooking surface, said sensor being electrically responsive to changes in temperatures of such surface, and such sensor comprising;

A. a relatively elongate helically wound coil of wire of a high temperature resistant material having a relatively high temperature coefficient of electrical resistance;
    B. first and second elongate conductors of a high temperature oxidation resistant material having high electrical conductivity, first ends of said first and second conductors electrically connected to first and second ends of said coil, respectively, so that the conductors are substantially in alignment with the length of the coil;
    C. a relatively elongate sheath of a high temperature oxidation resistant material having high thermal conductivity, said sheath including a wall having at least one flat outer side and whose inner surface defines the outer limits of a hollow embodied in such sheath and extending longitudinally therethrough, such sheath surrounding said coil and said conductors with said inner surface of said wall spaced from said coil and conductors, and the second end of at least one said conductor extending out of the corresponding end of the sheath for a selected distance therebeyond;
    D. a powder of an electrical insulating refractory material having relatively high thermal conductivity and compacted in said sheath in a surrounding relationship with said coil and conductors for substantially the full length of the sheath; and
    E. means for making first and second electrical connections to said first and second conductors respectively; whereby
    F. said sensor may be disposed with said flat outer side of the sheath thereof physically contacting an electrically heated surface for electrically sensing the temperature of such surface.

2. A sensor as in claim 1 and in which the electrical resistance of said coil increases and decreases, respectively, with increases and decreases in temperature of a heated surface against which said flat side is disposed.

3. A sensor as in claim 1 and in which the material of said coil comprises a nickel-maganese-aluminum alloy, the material of said conductors comprises a nickel-iron-chromium alloy, the material of said sheath also comprises a nickel-iron-chromium alloy, and said powder material is magnesium oxide in powder form.

4. A sensor as in claim 2 and in which the material of said coil comprises a nickel-maganese-aluminum alloy, the material of said conductors comprises a nickel-iron-chromium alloy, the material of said sheath also comprises a nickel-iron-chromium alloy, and said powder material is magnesium oxide in powder form.

5. A sensor as in claim 1 and in which said sheath is electrically connected to one of said conductors by crimping the sheath about such conductor adjacent said second end of the conductor.

6. A sensor as in claim 2 and in which said sheath is electrically connected to one of said conductors by crimping the sheath about such conductor adjacent said second end of the conductor.

7. A sensor as in claim 3 and in which said sheath is electrically connected to one of said conductors by crimping the sheath about such conductor adjacent said second end of the conductor.

8. A sensor as in claim 4 and in which said sheath is electrically connected to one of said conductors by crimping the sheath about such conductor adjacent said second end of the conductor.

9. An electrical resistant responsive temperature sensor comprising;

A. a relatively elongate helically wound coil of wire of a high temperature resistant material having a relatively high temperature coefficient of electrical resistance;
    B. first and second elongate conductors of a high temperature oxidation resistant material having high electrical conductivity, first ends of said first and second conductors electrically connected to first and second ends of said coil, respectively, so that the conductors are substantially in alignment with the length of the coil;

C. a relatively elongate sheath of a high temperature oxidation resistant material having high thermal conductivity, said sheath including a wall having at least one flat outer side and whose inner surface defines the outer limits of a hollow embodied in such sheath and extending longitudinally therethrough, such sheath surrounding said coil and portions of said conductors with said inner surface of said wall spaced from said coil and conductors for substantially the full length of the sheath and with at least one of said conductors extending out of the corresponding end of the sheath for a selected distance therebeyond;

D. a powder of an electrical insulating refractory material having relatively high thermal conductivity and compacted in said sheath in a surrounding relationship with said coil and conductors for substantially the full length of the sheath; and E. means for making first and second electrical connections to said first and second conductors respectively; whereby, F. when said sensor is disposed with said flat side of said sheath in physical contact with a surface of a radiant heated cooking sheet, the electrical resistivity of said coil varies in first and second directions accordingly as the temperature of said sheet varies in first and second directions, respectively.

10. A sensor as in claim 9 and in which the material of said coil comprises a nickel-maganese-aluminum alloy, the material of said conductors comprises a nickel-iron-chromium alloy, the material of said sheath also comprises a nickel-iron-chromium alloy, and said powder material is magnesium oxide in powder form.

* * * * *